United States Patent [19]

Tamura et al.

[11] 4,183,837

[45] Jan. 15, 1980

[54] LIQUID COATING COMPOSITION CONTAINING VINYL FLUORIDE-HEXAFLUOROPROPYLENE RESIN

[75] Inventors: Yorikazu Tamura; Yasuhisa Shishido, both of Hino, Japan

[73] Assignee: Teijin Limited, Osaka, Japan

[21] Appl. No.: 576,799

[22] Filed: May 12, 1975

Related U.S. Application Data

[63] Continuation of Ser. No. 457,412, Apr. 3, 1974, abandoned, which is a continuation-in-part of Ser. No. 267,920, Jun. 30, 1972, abandoned.

[51] Int. Cl.$^2$ ................................................ C08K 5/11
[52] U.S. Cl. .......................... 260/31.8 F; 260/30.4 R; 260/31.2 R; 260/32.4; 260/32.8 R
[58] Field of Search .................... 260/32.8 R, 31.2 R, 260/31.8 F, 30.4 R, 32.4

[56] References Cited

U.S. PATENT DOCUMENTS

| | | | |
|---|---|---|---|
| 2,549,935 | 4/1951 | Sauer | 260/87.5 |
| 3,051,677 | 8/1962 | Rexford | 260/29.6 |
| 3,340,222 | 9/1967 | Fang | 260/41 |
| 3,429,844 | 2/1969 | Neros | 260/29.1 |
| 3,454,517 | 7/1969 | Neros | 260/32.4 |
| 3,513,116 | 5/1970 | Sianesi | 260/23 |

*Primary Examiner*—Paul R. Michl
*Attorney, Agent, or Firm*—Sherman & Shalloway

[57] ABSTRACT

A liquid coating composition containing vinyl fluoride-hexafluoropropylene resin which has superior storage stability even in high concentrations and can form a coating layer having outstandingly superior mechanical strength properties such as tensile strength, initial Young's modulus or hardness and superior transparency and gloss. The liquid coating composition comprises a vinyl fluoride-hexafluoropropylene copolymer having an inherent viscosity of 0.2 to 2 and composed of 5 to 50 mol % of units derived from hexafluoropropylene, 0 to 10 mol % of units derived from a third component and the remainder being units derived from vinyl fluoride, and specified solvent, the amount of said copolymer being 1 to 50% by weight, as solids content, based on the weight of the composition. A method for preparing the vinyl fluoride-hexafluoropropylene copolymer resin suitable for use in the liquid coating compositions in the presence of an organic peroxide initiator, a fluorine-containing surface active agent, a dispersing agent and/or a molecular-weight regulating agent.

2 Claims, No Drawings

LIQUID COATING COMPOSITION CONTAINING VINYL FLUORIDE-HEXAFLUOROPROPYLENE RESIN

This is a continuation, of application Ser. No. 457,412, filed Apr. 3, 1974, now abandoned, which is a continuation-in-part application of Ser. No. 267,920, filed June 30, 1972, now abandoned.

This invention relates to a liquid coating composition containing vinyl fluoride-hexafluoropropylene resin which has superior storage stability even in high concentrations and is capable of forming a coating layer having outstandingly superior mechanical strength properties, such as tensile strength, initial Young's modulus or hardness and superior transparency and gloss, and to a method for preparation of the vinyl fluoride-hexafluoropropylene copolymer.

Generally, fluorine resins have excellent resistance to chemicals and weather, possess superior electrical properties, and have many special utilities. Because of superior weatherability in comparison to other resins, the fluorine resins are expected to be useful in the field of coating, and the development of this utility has recently attracted attention. On the other hand, the fluorine resins have the disadvantage of having poor processability and solubility.

Generally, polyvinyl fluoride and polyvinylidene fluoride have similar mechanical properties, but have extremely different solubilities. At room temperature, polyvinyl fluoride is insoluble in almost all solvents, but polyvinylidene fluoride has relatively superior solubility. It is soluble at room temperature in a solvent such as N,N-dimethyl formamide or N,N-dimethyl acetamide in a concentration of up to about 15% by weight. It is well known that at elevated temperatures, polyvinylidene fluoride becomes soluble in a wider variety of solvents than does polyvinyl fluoride.

Liquid coating compositions containing vinylidene fluoride-hexafluoropropylene copolymer have previously been known (see, for example, British Pat. Nos. 871,582; 1,001,765, U.S. Pat. No. 3,194,796 and French Pat. No. 1,350,581, U.S. Pat. No. 3,069,401).

British Pat. No. 871,582 discloses that a coating composition of an elastomer of a copolymer of from 30 to 70% by weight of vinylidene fluoride and from 70 to 30% by weight of hexafluoropropylene in a methyl ethyl ketone-toluol mixed solvent or methyl isobutyl ketone-toluol mixed solvent is useful for coating aromatic polyamide fabrics. The latter-mentioned British Pat. No. 1,001,765, to which U.S. Pat. No. 3,194,796 and French Pat. No. 1,350,581 correspond, discloses a liquid coating composition comprising a copolymer composed of 45–80% by weight of vinylidene fluoride, 0.05 to 2% by weight of a monomer selected from the group consisting of acrylonitrile, glycidyl methacrylate and ethylene dimethacrylate, and the remainder being hexafluoropropylene and a solvent such as acetone, ethyl acetate, acetic acid, methyl ethyl ketone, lower-molecular-weight esters, aldehyde, organic acid, etc.

However, the liquid coating composition containing a vinylidene fluoride-hexafluoropropylene copolymer has very poor storage stability and, especially when the concentration of the copolymer is high, cannot at all withstand storage for prolonged periods of time. Coated layers prepared from this composition do not have satisfactory mechanical strength, such as tensile strength, initial Young's modulus or hardness, and their transparency and gloss must still be improved.

U.S. Pat. No. 2,549,935 to Sauer discloses mixtures of copolymers of hexafluoropropylene with polymerizable unsaturated compounds selected from the group consisting of vinyl compounds, vinylidene compounds and halo-fluoro-substituted vinyl or vinylidene compounds and specifically refers to the copolymers of hexafluoropropylene with tetrafluoroethylene, ethylene or vinyl chloride. However, this patent does not teach or suggest that a copolymer of vinyl fluoride-hexafluoropropylene can comprise one component of a liquid coating composition which has outstanding storage stability and which, when used to form a coating layer, will have outstandingly superior mechanical strength properties.

Extensive work on the vinyl fluoride-hexafluoropropylene copolymer had led to the discovery that a vinyl fluoride-hexafluoropropylene copolymer having an inherent viscosity of 0.2 to 2 and composed of 5 to 50 mol % of units derived from hexafluoropropylene, 0 to 10 mol % of units derived from a monomer selected from the group consisting of vinyl esters of aliphatic carboxylic acids having 1 to 6 carbon atoms, or 0 to 1 mol % of units derived from a monomer selected from the group consisting of unsaturated aliphatic carboxylic acids having 3 to 6 carbon atoms, lower alkyl esters of acrylic acid having an epoxy group and lower alkyl esters of methacrylic acid having an epoxy group, and the remainder being units derived from vinylfluoride exhibits good solubility at room temperature in inexpensive organic solvents of more kinds that in the case of the vinylidene fluoride-hexafluoropropylene copolymer; that a solution of vinyl fluoride-hexafluoropropylene in such a solvent shows very superior storage stability; and a coated layer prepared from such a solution has improved mechanical strength such as tensile strength, initial Young's modulus and hardness and also superior transparency and gloss over those of the vinylidene fluoride-hexafluoropropylene resin liquid coating composition.

This was quite unexpected in view of the fact that polyvinyl fluoride and polyvinylidene fluoride have similar mechanical strength, but polyvinyl fluoride is far less soluble than polyvinylidene fluoride, and that a liquid coating composition consisting mainly of a polyvinyl fluoride or a vinyl fluoride-hexafluoropropylene copolymer has not specifically been proposed heretofore.

It is, therefore, an object of the present invention to provide a liquid coating composition, preferably in the form of a solvent solution, containing a vinyl fluoride-hexafluoropropylene copolymer which has excellent storage stability in a high concentration and can form a coated layer having very high mechanical strength such as tensile strength, initial Young's modulus or hardness and superior transparency and gloss.

It is another object of the present invention to provide a process for preparing a vinyl fluoride-hexafluoropropylene copolymer suitable for use in such a solvent solution of a liquid coating composition.

Many other objects and advantages of the present invention will become more apparent from the following description.

The film-forming vinyl fluoride-hexafluoropropylene copolymer used in this invention, as has already been stated, is composed of (i) 5 to 50 mol %, preferably 10 to 50 mol %, of units derived from hexafluoropropylene, (ii) 0 to 10 mol % of units derived from a monomer selected from the group consisting of vinyl esters of aliphatic carboxylic acids having 1 to 6 carbon atoms, or 0 to 1 mol % of units derived from a monomer selected from the group consisting of unsaturated aliphatic carboxylic acids having 3 to 6 carbon atoms, lower alkyl esters of acrylic acid having an epoxy group, said esters preferably having 1 to 4 carbon atoms and lower alkyl esters of methacrylic acid having an epoxy group, said esters preferably having 1 to 4 carbon atoms, and (iii) the remainder being units derived from vinyl fluoride. This copolymer has an inherent viscosity of 0.2 to 2, preferably 0.2 to 1.

Examples of the vinyl esters of aliphatic carboxylic acids include vinyl acetate, vinyl propionate, vinyl butyrate, vinyl caproate, vinyl stearate, vinyl laurate, and vinyl oleate.

Examples of the unsaturated aliphatic carboxylic acids include acrylic acid, methacrylic acid, itaconic acid, crotonic acid, fumaric acid and maleic acid.

Examples of the lower alkyl esters of acrylic acid having an epoxy group include glycidyl acrylate.

As the lower alkyl ester of methacrylic acid having an epoxy group, there can be used, for example, glycidyl methacrylate.

The vinyl fluoride-hexafluoropropylene copolymer for use in the liquid coating composition of the present invention can be produced as follows:

An aqueous suspension polymerization of 5 to 50 mol % of hexafluoropropylene, 0 to 1 mol % of said vinyl ester or 0 to 1 mol % of said other monomer (ii), and 50 to 95 mol % of vinyl fluoride in the presence of a known organic peroxide initiator, such as diisopropyl peroxydicarbonate, tertiary butyl peroxypivalate, lauryl peroxide, ditertiary butyl peroxide, isobutyl peroxide, di-(2-ethyl-hexyl)-peroxydicarbonate or di-(2-ethoxyethyl)-peroxydicarbonate. The reaction temperature preferably used is about 10° to 100° C. According to the present invention, the aqueous suspension polymerization is carried out in the copresence of a fluorine-containing surface active agent and a dispersing agent in order to obtain a homogeneous copolymer.

If the copolymerization of vinyl fluoride and hexafluoropropylene is carried out using only a dispersing agent such as methyl cellulose or polyvinyl alcohol without adding a fluorine-containing surface active agent, the resulting copolymer is non-uniform, and the formation of a mixture of a polymer containing a major proportion of vinyl fluoride units and a copolymer containing a minor proportion of vinyl fluoride units is observed. In fact, this copolymer mixture is separable into a portion which is soluble in methyl ethyl ketone and a portion which is not.

On the other hand, if the copolymerization is carried out using only the fluorine-containing surface active agent without using the dispersing agent, the resulting copolymer is in the form of relatively uniform powders, but scales are very liable to adhere to the polymer, and the polymer lends itself to difficult handling. Also, the polymer contains a portion insoluble in methyl ethyl ketone although in a very slight amount.

The conjoint use of the fluorine-containing surface active agent and the dispersing agent together with the organic peroxide initiator can lead to a homogeneous copolymer of vinyl fluoride and hexafluoropropylene. Scales do not adhere to the copolymer, and it is easy to separate and recover the copolymer.

For purpose of adjusting the degree of polymerization of the copolymer, a compound such as trichlorofluoromethane, 1,2-difluoro-1,1,2,2-tetrachloroethane, or 1,1,2-trifluoro-1,2,2-trichloroethane may be present in the reaction system. If carbon tetrachloride or mercaptan, generally known as a chain transfer agent in the polymerization of vinyl compounds, is used, the polymerization is extremely inhibited, or the resulting copolymer is liable to be colored. The preferred amount of such a compound is 0.5 to 50 parts by weight per 100 parts by weight of the total amount of monomers, the amount of 1 to 40 parts by weight being especially preferred.

Examples of the fluorine-containing surface active agent include water-soluble salts of polyfluorinated aliphatic carboxylic acids and water-soluble salts of polyfluorochlorinated aliphatic carboxylic acids, such as sodium salt of perfluorooctanoic acid or sodium salt of perfluoroalkylsulfonic acid, and phosphoric acid esters or sulfuric acid esters of polyfluorinated or polyfluorochlorinated aliphatic alcohols.

Examples of the dispersing agent include methyl cellulose, gelatine, tragacanth, starch, carboxymethy cellulose, polyvinyl alcohol, partially saponified polyvinyl alcohol, and polyacrylic acid. Other known dispersing agents used in the aqueous suspension polymerization of vinyl monomers can be used.

The amount of the fluorine-containing surface active agent is from about 0.005% by weight to about 2% by weight based on the total amount of the monomers.

The amount of the dispersing agent is preferably from about 0.1 to about 3.0% by weight based on the total amount of the monomers.

The weight ratio of the dispersing agent to the fluorine-containing surface active agent is preferably 1–2.

Vinyl fluoride-hexafluoropropylene copolymers containing less than 5 mol % of units derived from hexafluoropropylene prove unsuitable because of very poor solubility in solvent. Copolymers of vinyl fluoride and hexafluoropropylene containing more than 50% of units derived from hexafluoropropylene have increased solubility, but a coated layer obtained from a solution of this copolymer has a very soft and weak surface which has a low softening point and is, therefore, useless.

The vinyl ester and the other monomer (ii) which may be contained in the liquid coating composition of this invention in an amount not more than 10 mol % and not more than 1 mol % respectively can be utilized to improve the hardness, adhesion to the base material, etc., of the resulting coated layer.

The vinyl fluoride-hexafluoropropylene copolymer used in this invention has an inherent viscosity of 0.2 to 2, preferably 0.2 to 1, more preferably 0.2 to 0.7. The inherent viscosity ($\eta inh$) is measured at 30° C. with respect to a solution of 0.5 g of the copolymer in 100 ml of dimethyl formamide, and is expressed by the following equation $$\eta inh = \frac{1}{C} \ln \frac{t}{t_o}$$

wherein C(0.5 g/100 ml.) is the concentration of the polymer, t (seconds) is the falling time of N,N-dimethyl formamide solution of the polymer, and $t_o$ (seconds) is the falling time of N,N-dimethyl formamide.

If the inherent viscosity of the copolymer used is lower than 0.2, the film on the suerface of a coated layer is weak, and the coating effect is not fully achieved. If the inherent viscosity is higher than 2, a solution of the copolymer has high viscosity, and the handling of the liquid coating composition or the coating operation becomes extremely difficult. Especially when such a solution is applied by spray coating, the surface of the coating exhibits a pattern of randomly arranged yarns and it is extremely difficult to form a uniform coating film. Generally, copolymers having an inherent viscosity within this range are of relatively low molecular weight and have somewhat unsatisfactory mechanical properties for general uses. It has, however, been found that for application as coating agents, copolymers of such inherent viscosities are superior in every respect.

The solvent for use in the preparation of the liquid coating composition of this invention is selected from (1) aliphatic ketones having not over 9 carbon atoms, (2) alkyl esters with not over 10 carbon atoms of aliphatic monocarboxylic acids and halides thereof, (3) lower alkyl esters of $C_{2-7}$ aliphatic dicarboxylic acids, (4) aliphatic monocarboxylic acids having 2 to 4 carbon atoms and anhydrides thereof, (5) cyclic ethers, (6) aliphatic nitriles having 2 to 6 carbon atoms, and (7) $C_2$-$C_4$ dialkyl esters of carbonic acid, ethylene carbonate, cyclohexanone, N,N-dimethyl formamide, N,N-dimethyl acetamide, dimethyl sulfoxide, N-methyl pyrolidone and γ-butyrolactone. These solvents may be used alone or in combination, and a combination of these frequently gives good results.

It is preferred that the copolymer be used as a solvent solution, but it can also be used as a suspension emulsion or the like. In the latter case, a small amount of one or more non-solvents such as xylene, toluene or n-hexane can be used conjointly.

Examples of aliphatic ketones having not over 9 carbon atoms are acetone, methyl ethyl ketone, methyl isobutyl ketone, methyl isopropyl ketone and diisobutyl ketone. Aliphatic ketones having 10 or more carbon atoms or aromatic ketones such as methylphenyl ketone are undesirable because of poor solubility or too high boiling points which cause difficulty of drying the coated film.

Examples of alkyl esters of aliphatic monocarboxylic acids and halides thereof having not over 10 carbon atoms include methyl formate, ethyl acetate, butyl acetate, butyl propionate, isoamyl acetate, isamyl butyrate, ethyl monochloroacetate and ethyl trichloroacetate. Alkyl esters of aliphatic monocarboxylic acids aving 10 or more carbon atoms, for example aliphatic monocarboxylic acid esters or halides thereof, such as methyl laurate or n-butyl stearate, and aromatic carboxylic acid esters or halides thereof, such as methyl benzoate or methyl salicylate have inferior ability to dissolve the copolymer, and these aliphatic monocarboxylic acid esters having more carbon atoms are inadequate because of high boiling point and low volatility.

Examples of the lower alkyl esters of aliphatic dicarboxylic acids having 2 to 7 carbon atoms, especially those esters having 1 to 4 carbon atoms, include diethyl oxalate, diethyl malonate, and diisopropyl malonate. Esters of aliphatic dicarboxylic acids having 8 or more carbon atoms also disslove said copolymer well, but are inadequate for use in the present invention because of high boiling points and difficulty of volatilization.

Examples of the aliphatic monocarboxylic acids having 2 to 4 carbon atoms and anyhydrides thereof include acetic acid, propionic acid, butyric acid and acetic anhydride. Formic acid having one carbon atoms and aliphatic monocarboxylic acids having 5 or more carbon atoms and anhydrides thereof are unsuitable because of extremely poor ability to dissolve the copolymer.

Examples of the cyclic ether include dioxane and tetrahydrofuran. Aliphatic ethers such as ethyl ether are totally unable to dissolve the copolymer and, therefore, are useless in the present invention.

Examples of the aliphatic nitriles having 2 to 6 carbon atoms include acetonitrile, butyronitrile, valeronitrile, and capronitrile. Aliphatic nitriles having 7 or more carbon atoms and aromatic nitriles have small ability to dissolve the copolymer and cannot form solutions of high concentrations and also have high boiling points and difficulty of volatilization.

The preferred solvent is at least one relatively low boiling solvent selected from aliphatic ketones having 7 or less carbon atoms, aliphatic monocarboxylic acid esters, aliphatic nitriles and cyclic ethers or a mixture of these with another solvent specified above in which the amount of said low boiling solvent is at least 40% by weight. Such a mixed solvent makes it especially possible to control the rate of volatilization moderately and, therefore, the loss of transparency of the coated layer can be easily prevented.

As previously stated, the liquid coating composition of this invention is a liquid comprising 1 to 50% by weight, preferably 1 to 40% by weight, of a copolymer of vinyl fluoride and hexafluoropropylene having the above-specified inherent viscosity and solvent. A composition containing the copolymer in a concentration of more than 50% by weight has high viscosity and lends itself to difficult handling. Those containing the copolymer in a concentration lower than 1% by weight are undesirable in the procedure of forming a coating layer since the amount of the solvent that has to be volatilized is too large.

The liquid coating composition of this invention may contain up to 5% by weight, based on the weight of the composition, of another resin which is soluble in the solvents used in the invention in order to control the viscosity of the composition, the adhesiveness of the coated layer, its hardness, etc. Examples of the additional resin include homo- or copolymers of acrylic acid, methacrylic acid, or esters of said acids, homo- or copolymers of aromatic vinyl compounds such as styrene or α-methyl styrene, homo- or copolymers of halogen-containing vinyl compounds such as vinyl fluoride, vinylidene fluoride, trifluorochloroethylene, tetrafluoroethylene, vinyl chloride or vinylidene chloride, and chlorinated rubber.

The liquid coating composition of this invention may also contain additives employed customarily, such as coloring agents (dyes, pigments), viscosity control agents, wetting agents, rustproof agents or defoaming agents. The liquid coating composition of this invention may also contain a cross-linking agent or a cross-linking promotor. Specific examples of such additives are inorganic pigments such as red ion oxide, micaceous iron oxide, chrome yellow, Prussian Blue, Ultramarine Blue, zinc chromate, molybdenum red, titanium white, barytes, precipitated barium sulfate, barium carbonate, carbon black, whiting, precipitated calcium carbonate, gypsum, asbestine, china clay, silica, white carbon, kieselguhr, talc, magnesium carbonate, alumina white, glass white, satin white, zinc oxide, basic lead carbonate, basic lead sulfate, lead sulfate, lithopone, zinc sulfide, antimony oxide, cadmium yellow, calcium plumbate, red lead, cadmium red, chrome green, aluminum powder, bronze powder, copper powder, tin powder, lead powder, zinc dust, zinc tetraoxy chromate, zinc phosphate or strontium chromate; organic pigments such as Permanent Red F4R, Lake Red C, Lithol Red R, Brilliant Carmine BS, Pigment Scarlet 3B, Pyrazolone Red, Pyrazolone Orange G, Benzidine Orange 2G, Hanza Yellow 3R, Alkali Blue Lake, Phthalocyanine Blue, Phthalocyanine Green or Bordeaux 10B; viscosity control agents such as amine treated clays, for example Bentone 34, Bentone 38 (National Lead Co.), vegetable oil derivatives, for example Dehysol R, Ceroxin Special (Henkel International GmbH), Thixcin R, Thiaxatrol ST, Post-4(The Baker Caster Oil Co.), metal soaps such as aluminum stearate, xylene, toluene, or n-hexane; wetting agents such as leciohin, surface active agents, for example ANTITERRA-A, ANTITERRA-P(BYK-Mallinkvodt); plasticizers, for example phthalic acid esters such as dimethyl phthalate, dibutyl phthalate, or dioctyl phthalate, phosphoric acid esters such as trichloroethyl phosphate or triphenyl phosphate, glycolic acid esters such as methyl phthalyl glycolate or ethyl phthalyl ethyl glycolate, or glycol derivatives such as ethyl glycol or butyl glycol; light stabilizers, for example salicylic acid type ultraviolet absorbers such as Inhibitor OPS (p-octyl phenyl salicylate, Eastman Chemical Products, Inc.), Light Absorber TBS (4-tert.-butyl phenyl salicylate, Dow Chemical Company), benzophenone type ultraviolet absorbers such as Cyasorb UV-9, UV-24, UV-207 and UV-284 (2-hydroxy-4-methoxy benzophenone, American Cyanamid Company), benzotriazole type ultraviolet absorbers such as Tinuvin P [2-(2'-hydroxy-5'-methylphenyl)-benzotriazole, Geigy], other ultraviolet absorbers such as Cyasorb UV-1084 [2,2'-thiobis(4-tert-octyl phenolate)]n-butylamine Ni, Inhibitor RMB (resorcinal monobenzoate, Eastman Chemical Products, Inc.), antioxidants, for example amine-type antioxidants such as phenyl-$\alpha$-naphthylamine, phenyl-$\beta$-naphthylamine, ketone-amine condensate type antioxidants such as 6-ethoxy-2,2,4-trimethyl-1,2-dihydroquinoline, a polymer of 2,2,4-trimethyl-1,2-dihydroquinoline, aldehyde-amine condensate type antioxidants such as aldol-$\alpha$-naphthylamine, mixed amine type antioxidants such as Akroflex C, Cb, F (Du Pont) or Thermaflex A (Du Pont), phenolic antioxidants such as 2,4-dimethyl-6-tert-butyl phenol or 2,6-ditert.-butyl-p-cresol, and other antioxidants such as polycarbodiimide, propyl gallate ot tri)nonylated phenyl) phosphite; and defoamers such as Toray Silicon DC 7 (Toray Industries, Inc.), Toray Silicon OH 5540 (Toray Industries, Inc.) or BYK-SL (BYK-Mallinckrodt).

Examples of the cross-linking agent include aliphatic polyamides such as methylene diamine, ethylene diamine, tetramethylene diamine, hexamethylene diamine, triaminopropane, tris(2-aminoethyl)amine, diethylene triamine or triethylene tetramine, aromatic polyamines such as o-, m- and p-phenylene diamines, triaminobenzene, pentaminobenzene or tolylene diamine, and carbamates of said polyamines such as hexamethylene diamine carbamate. Examples of the cross-linking accelerator are basic divalent metal oxides such as magnesium oxide, calcium oxide, lead oxide or barium oxide, basic metal hydroxides such as magnesium hydroxide, calcium hydroxide or barium hydroxide, or macrocyclic compounds such as 2,5,8,15,18,21-hexaoxatricyclo[20,4,0,0]hexacone or 2,5,8,11-tetraoxabicyclo[21,0,4,0]hexadecane.

The amount of the cross-linking agent is about 0.1 to 10% by weight based on the weight of the vinyl fluoride/hexafluoropropylene copolymer. The amount of the cross-linking promoter is about 5 to about 50% by weight based on the weight of the copolymer, if the cross-linking agent is used in the above-mentioned amount. Cross-linking occurs at room temperature, and therefore, it is not necessary to conduct it at elevated temperatures. But, it is possible to conduct it at an elevated temperature of up to 300° C. after a coating is formed and the solvent evaporated.

The coating of the liquid composition on a base material can be performed according to any desired method known in the art, such as brush coating, spray coating, roller coating, casting or immersion.

The liquid composition of this invention can be applied directly to the base material but may also be applied thereto through a primer in order to improve the adhesion of the coating to the base material or the flexibility of the coated film.

For example, the primer may include a coating of a copolymer of 95-40% by weight of methyl methacrylate and 5-60% by weight of at least one unsaturated monomer selected from the group consisting of methacrylic acid esters other than methyl methacrylate, acrylic acid esters and unsaturated compounds containing a free carboxyl group.

Examples of the acrylic acid esters include methyl acrylate, ethyl acrylate, butyl acrylate, 2-ethylhexyl acrylate, and dodecyl acrylate. Examples of the methacrylic acid esters include methyl methacrylate, butyl methacrylate, 2-ethylhexyl methacrylate, and dodecyl methacrylate.

The unsaturated compound containing a free carboxyl group may be any compound which can be copolymerized with methyl methacrylate, examples of which include acrylic acid, methacrylic acid, itaconic acid, fumaric acid or maleic acid.

The primer may be of a solution-type acrylic lacquer or an aqueous dispersion type acrylic emulsion.

Furthermore, the primer may consist of two under coat layers, a first layer consisting of at least one primer selected from epoxy resin type primers, nitrocellulose type primers and acrylic type primers, and a second layer consisting of a mixture of a copolymer of hexafluoropropylene and vinylidene fluoride soluble in methyl ethyl ketone and a copolymer of methyl methacrylate and an acrylic acid ester and/or a methacrylic acid ester other than the methyl methacrylate containing 0 to 30% by weight of an unsaturated monomer containing a free carboxyl group, the weight ratio of the first-mentioned copolymer to the second-mentioned copolymer being 1:99 to 40:60.

As the unsaturated monomer containing a free carboxyl group, the acrylic acid ester and the methacrylic acid ester, those exemplified above can be utilized.

In an alternative embodiment, the primer may consist of a first layer including either one of zinc chromate or chromic anhydride, polyvinyl butyral, alcohol, phosphoric acid and water, and a second layer comprising a copolymer of methyl methacrylate and an acrylic acid ester and/or a methacrylic acid ester other than methyl methacrylate. The same acrylic acid esters and methacrylic acid esters as exemplified above may be used for this purpose.

The liquid coating composition of this invention can form a coated layer having extremely high mechanical strength such as tensile strength, initial Young's modulus and hardness and remarkably improved transparency and gloss. This liquid coating composition exhibits excellent storage stability even in high concentrations of the resin. Furthermore, the coated layer has good weatherability, resistance to chemicals, electric characteristics and thermal stability inherently possessed by fluorine resins.

The liquid coating composition of this invention is useful for forming a coating on the surface of various base materials such as metals, wood, plastics, glass or ceramics and can also be utilized for surface coating of fibers, yarns, knitted and woven fabrics, non-woven fabrics and other filamentary structures. The viscosity of the liquid coating structure can be varied according to the field for which the composition is intended and, also, according to the types and amounts of additives. Usually, it may be 10 to 5,000 centipoises.

The present invention will be illustrated by the following Examples and Comparative Examples.

The various properties of the coated layer and the liquid composition were determined as follows:

(1) Tensile Strength and Initial Young's Modulus

Measured in accordance with JIS K-6723 using an Instron universal tensile tester.

(2) Hardness

A composition was prepared by mixing 30 parts by weight of a vinyl fluoride-hexafluoropropylene copolymer, 70 parts by weight of a solvent and 10 parts by weight of titanium oxide (Tipaque R-820, Ishihara Sangyo Kaisha Ltd.) in a ball mill for 20 hours. The composition was coated on a polished steel plate and air dried for 48 hours. Thereafter, the hardness of the coated layer was measured in accordance with JIS G-3312.

(3) Transparency

A film having a thickness of 25 microns was prepared from the composition of this invention by the casting method, and the percent transmission at 600 m$\mu$ of this film was measured.

(4) Gloss

The same composition shown in (2) above was coated on a polished steel sheet and air dried for 48 hours, and then the gloss was measured in accordance with JIS K-5400.

(5) Storage Stability

10–30 parts by weight of the vinyl fluoride-hexafluoropropylene copolymer was dissolved in 70–90 parts by weight of a solution. The solution was left to stand at room temperature (18° C.) and the time required until the occurrence of gellation of the solution was measured.

EXAMPLE 1

Preparation of Copolymer

A 100 ml. autoclave was completely purged with nitrogen and then charged with 65 g of deoxygenated water, 0.15 g of methyl cellulose, 0.1 g of sodium perfluorooctanesulfonate, and 0.237 g of diisopropyl peroxydicarbonate. These compounds were frozen in a dry ice methanol coolant in a stream of nitrogen. A lid was mounted on the autoclave and the autoclave was carefully purged with nitrogen under reduced pressure. The inside of the autoclave was maintained at reduced pressure and in the frozen state. Separately prepared vinyl fluoride (12.9 g; 0.281 mol) and hexafluoropropylene (10.8 g; 0.072 mol) were charged successively into the autoclave by means of distillation. The temperature was returned to room temperature and rapidly subjected to a rotary constant-temperature shaking apparatus at 50° C. and the polymerization reaction was carried out for 8 hours.

The polymerization yield was 84.0% and the inherent viscosity of the resultant polymer was 0.72.

EXAMPLE 2

Preparation of Copolymer

The copolymerization reaction was carried out at 50° C. for 8 hours in the same way as set forth in Example 1 except that a 300 ml. autoclave was used, and 33.5 g (0.729 mol) of vinyl fluoride, 45.4 g (0.302 mol) of hexafluoropropylene, 0.789 g of diisopropyl peroxydicarbonate, 0.4 g of methyl cellulose, 0.3 g of sodium perfluorooctanesulfonate, and 165 g of deoxygenated water were used.

There was obtained 63.2 g (polymerization yield 80.1%) of a white granular copolymer having an inherent viscosity of 0.70.

EXAMPLE 3

Preparation of Copolymer

A 100 ml. autoclave was completely purged with nitrogen and charged with 65 g of deoxygenated water, 0.2 g of methyl cellulose, 0.1 g of sodium perfluorooctanesulfonate, 0.263 g of diisopropyl peroxydicarbonate, and 3 g of trichlorofluoromethane. These compounds were frozen in a dry ice methanol coolant in a stream of nitrogen. The autoclave was purged carefully with nitrogen at reduced pressure. The inside of the autoclave was maintained at reduced pressure and in the frozen state. Separately prepared vinyl fluoride (11.2 g; 0.243 mol) and hexafluoropropylene (15.1 g; 0.10 mol) were charged successively into the autoclave by means of distillation. After charging, the temperature was returned to room temperature, and the reaction mixture was subjected quickly to a rotary constant temperature shaker at 50° C. The polymerization reaction was conducted and, after a lapse of 8 hours, the unreacted monomers were recovered. The polymerization yield was 76.0% and the resulting copolymer was white granules having an inherent viscosity of 0.29.

EXAMPLE 4

Preparation of Copolymer

The polymerization reaction was carried out for 8 hours at 50° C. in the same way as set forth in Example 1 except that 70 g of deoxygenated water, 0.24 g of methyl cellulose, 0.15 g of sodium perfluorooctanesulfonate, 0.265 g of diisopropyl peroxydicarbonate, 1.5 g of trichlorofluoromethane, 12.9 g (0.28 mol) of vinyl fluoride, and 13.6 g (0.091 mol) of hexafluoropropylene were used. The polymerization yield was 77.0% and there was obtained a white granular copolymer having an inherent viscosity of 0.42.

EXAMPLE 5

Preparation of Copolymer

The polymerization reaction was carried out for 8 hours at 50° C. in the same way as set forth in Example 1 except that 12.9 g (0.281 mol) of vinyl fluoride, 10.8 g (0.072 mol) of hexafluoropropylene and 0.16 g (0.0011 mol) of glycidyl methacrylate were used. The polymerization yield was 855 and there was obtained a white granular copolymer having an inherent viscosity of 0.53.

EXAMPLES 6-15 AND COMPARATIVE EXAMPLES 1-21

A stirrer-equipped flask was charged with 30 parts by weight of a copolymer having an inherent viscosity of 0.71 and derived from 70.7 mol % of vinyl fluoride and 29.3 mol % of hexafluoropropylene and 70 parts by weight of methyl ethyl ketone, and these compounds were stirred at 20° C. There was easily obtained a colorless clear liquid coating composition.

Similar liquid coating compositions were prepared using various different copolymers and solvents. The results of the tests (1) to (5) mentioned above are shown in Table 1.

In the following tables, the following abbreviations were used:
VF: vinyl fluoride
HFP: hexafluoropropylene
VDF: vinylidene fluoride
GMA: glycidyl methacrylate
AA: acrylic acid
VAc: vinyl acetate Table 1

| No. | 1st Component Kind | 1st Component Mol % | 2nd Component Kind | 2nd Component Mol % | 3rd Component Kind | 3rd Component Mol % | Inherent Viscosity ($\eta$inh) | Resin Concentration (% by wt.) | Solvent |
|---|---|---|---|---|---|---|---|---|---|
| Ex. 6 | VF | 70.7 | HFP | 29.3 | — | — | 0.71 | 30 | Methyl ethyl ketone |
| Comp. Ex. 1 | VF | 100 | — | — | — | — | — | — | Methyl ethyl ketone |
| Comp. Ex. 2 | VDF | 70.7 | HFP | 29.3 | — | — | 0.67 | 30 | Methyl ethyl ketone |
| Ex. 7 | VF | 90.5 | HFP | 9.5 | — | — | 0.81 | 10 | Acetone |
| Comp. Ex. 3 | VDF | 90.5 | HFP | 9.5 | — | — | 0.74 | 10 | Acetone |
| Comp. Ex. 4 | VF | 95.8 | HFP | 4.2 | — | — | 0.80 | 10 | Acetone |
| Comp. Ex. 5 | VF | 44.7 | HFP | 55.3 | — | — | 0.61 | 30 | Acetone |
| Ex. 8 | VF | 74.7 | HFP | 25.0 | GMA | 0.3 | 0.52 | 30 | Methyl isobutyl ketone |
| Comp. Ex. 6 | VDF | 74.7 | HFP | 25.0 | GMA | 0.3 | 0.50 | 30 | Methyl isobutyl ketone |
| Ex. 9 | VF | 68.3 | HFP | 31.7 | — | — | 0.73 | 30 | Cyclohexanone |
| Comp. Ex. 7 | VDF | 68.3 | HFP | 31.7 | — | — | 0.63 | 30 | Cyclohexanone |
| Comp. Ex. 8 | VF | 68.3 | HFP | 31.7 | — | — | 0.73 | 10 | Methyl phenyl ketone |
| Ex. 10 | VF | 70.7 | HFP | 29.3 | — | — | 0.71 | 30 | Ethyl formate |
| Comp. Ex. 9 | VDF | 70.7 | HFP | 29.3 | — | — | 0.67 | 30 | Ethyl formate |
| Ex. 11 | VF | 90.5 | HFP | 9.5 | — | — | 0.81 | 10 | Ethyl acetate |
| Comp. Ex. 10 | VDF | 90.5 | HFP | 9.5 | — | — | 0.74 | 10 | Ethyl acetate |
| Comp. Ex. 11 | VF | 95.8 | HFP | 4.2 | — | — | 0.80 | 10 | Ethyl acetate |
| Ex. 12 | VF | 55 | HFP | 45 | — | — | 0.63 | 30 | Butyl acetate |
| Comp. Ex. 12 | VDF | 55 | HFP | 45 | — | — | 0.53 | 30 | Butyl acetate |
| Ex. 13 | VF | 74.7 | HFP | 25.0 | GMA | 0.3 | 0.70 | 30 | Isoamyl acetate |
| Comp. Ex. 13 | VDF | 74.7 | HFP | 25.0 | GMA | 0.3 | 0.67 | 30 | Isoamyl acetate |
| Comp. Ex. 14 | VF | 73.4 | HFP | 25.0 | GMA | 1.6 | 0.66 | 10 | Isoamyl acetate |
| Ex. 14 | VF | 80 | HFP | 20 | — | — | 0.63 | 20 | Butyl propionate |
| Comp. Ex. 15 | VDF | 80 | HFP | 20 | — | — | 0.66 | 20 | Butyl propionate |
| Comp. Ex. 16 | VF | 96 | HFP | 3 | — | — | 0.78 | 10 | Butyl propionate |
| Comp. Ex. 17 | VF | 42 | HFP | 58 | — | — | 0.60 | 30 | Butyl propionate |
| Ex. 15 | VF | 58 | HFP | 42 | — | — | 0.55 | 30 | Ethyl chloroacetate |
| Comp. Ex. 18 | VDF | 58 | HFP | 42 | — | — | 0.51 | 30 | Ethyl chloroacetate |
| Comp. Ex. 19 | VF | 80 | HFP | 20 | — | — | 0.63 | 20 | Methyl salicylate |
| Comp. Ex. 20 | VF | 80 | HFP | 20 | — | — | 0.63 | 20 | Methyl laurate |
| Comp. Ex. 21 | VF | 80 | HFP | 20 | — | — | 0.63 | 20 | Benzyl acetate |

| No. | Storage stability (hr) | Tensile strength (kg/cm$^2$) | Elongation (%) | Initial Young's modulus (kg/cm$^2$) | Transparency (%) |
|---|---|---|---|---|---|
| Ex. 6 | over 720 | 220 | 273 | 2,340 | 89 |
| Comp. Ex. 1 | (Insoluble) | | | | |
| Comp. Ex. 2 | 10 | 108 | 439 | 14 | 58 |
| Ex. 7 | 360 | 340 | 269 | 4,300 | 90 |
| Comp. Ex. 3 | 6 | 180 | 317 | 70 | 61 |
| Comp. Ex. 4 | (Partially insoluble) | | | | |
| Comp. Ex. 5 | over 720 | 101 | 430 | 60 | 88 |
| Ex. 8 | over 720 | 228 | 316 | 3,120 | 90 |
| Comp. Ex. 6 | 6 | 106 | 428 | 61 | 57 |
| Ex. 9 | 360 | 230 | 306 | 2,430 | 90 |
| Comp. Ex. 7 | 5 | 95 | 630 | 13 | 58 |
| Comp. Ex. 8 | (Partially insoluble) | | | | |
| Ex. 10 | 480 | 220 | 273 | 2,340 | 88 |
| Comp. Ex. 9 | 3 | 108 | 439 | 14 | 50 |
| Ex. 11 | 240 | 340 | 269 | 4,300 | 87 |
| Comp. Ex. 10 | 6 | 180 | 317 | 70 | 52 |
| Comp. Ex. 11 | (Partially insoluble) | | | | |
| Ex. 12 | over 720 | 180 | 531 | 631 | 91 |
| Comp. Ex. 12 | 10 | 84 | 738 | 12 | 62 |
| Ex. 13 | 240 | 228 | 316 | 3,120 | 86 |
| Comp. Ex. 13 | 3 | 106 | 428 | 61 | 59 |
| Comp. Ex. 14 | (Partially insoluble) | | | | |
| Ex. 14 | 240 | 294 | 215 | 4,500 | 89 |

Table 1-continued

| | | Liquid Coating Composition | | | |
|---|---|---|---|---|---|
| Comp. Ex. 15 | 6 | 112 | 531 | 30 | 60 |
| Comp. Ex. 16 | | (Insoluble) | | | |
| Comp. Ex. 17 | over 720 | 80 | 432 | 52 | 87 |
| Ex. 15 | 360 | 182 | 269 | 113 | 83 |
| Comp. Ex. 18 | 6 | 78 | 438 | 11 | 59 |
| Comp. Ex. 19 | | (Partially insoluble) | | | |
| Comp. Ex. 20 | | (Insoluble) | | | |
| Comp. Ex. 21 | | (Partially insoluble) | | | |

EXAMPLES 16 TO 41 AND COMPARATIVE EXAMPLES 22 TO 64

Various liquid coating compositions were prepared using copolymers of various ratios of copolymer units and various solvents both indicated in Table 2. The results are also shown in Table 2.

Table 2

| | Liquid Coating Composition | | | | | | | | |
|---|---|---|---|---|---|---|---|---|---|
| | Resin Component | | | | | | Inherent Viscosity | Resin Concentration | |
| | 1st Component | | 2nd Component | | 3rd Component | | | | |
| No. | Kind | Mol % | Kind | Mol % | Kind | Mol % | ($\eta$inh) | (% by wt.) | Solvent |
| Ex. 16 | VF | 70 | HFP | 30 | — | — | 0.71 | 30 | Acetic acid |
| Comp. Ex. 22 | VDF | 70 | HFP | 30 | — | — | 0.67 | 30 | Acetic acid |
| Ex. 17 | VF | 92 | HFP | 8 | — | — | 0.74 | 10 | Acetic acid |
| Comp. Ex. 23 | VDF | 92 | HFP | 8 | — | — | 0.70 | 10 | Acetic acid |
| Comp. Ex. 24 | VF | 97 | HFP | 3 | — | — | 0.80 | 10 | Acetic acid |
| Ex. 18 | VF | 55 | HFP | 45 | — | — | 0.58 | 30 | Acetic acid |
| Comp. Ex. 25 | VDF | 55 | HFP | 45 | — | — | 0.54 | 30 | Acetic acid |
| Comp. Ex. 26 | VF | 45 | HFP | 55 | — | — | 0.55 | 30 | Acetic acid |
| Ex. 19 | VF | 75 | HFP | 25 | — | — | 0.66 | 30 | Propionic acid |
| Comp. Ex. 27 | VDF | 75 | HFP | 25 | — | — | 0.61 | 30 | Propionic acid |
| Comp. Ex. 28 | VF | 98.2 | HFP | 2.8 | — | — | 0.77 | 10 | Propionic acid |
| Comp. Ex. 29 | VF | 43 | HFP | 57 | — | — | 0.53 | 30 | Propionic acid |
| Ex. 20 | VF | 60 | HFP | 40 | — | — | 0.59 | 30 | Acetic anhydride |
| Comp. Ex. 30 | VDF | 60 | HFP | 40 | — | — | 0.53 | 30 | Acetic anhydride |
| Comp. Ex. 31 | VF | 60 | HFP | 40 | — | — | 0.59 | 10 | Formic acid |
| Ex. 21 | VF | 73.2 | HFP | 24.0 | VAc | 2.8 | 0.67 | 30 | Acetic acid |
| Comp. Ex. 32 | VDF | 73.2 | HFP | 24.0 | VAc | 2.8 | 0.65 | 30 | Acetic Acid |
| Ex. 22 | VF | 65 | HFP | 35 | — | — | 0.59 | 30 | Diethyl oxalate |
| Comp. Ex. 33 | VDF | 65 | HFP | 35 | — | — | 0.55 | 30 | Diethyl oxalate |
| Ex. 23 | VF | 90 | HFP | 10 | — | — | 0.75 | 10 | Diethyl oxalate |
| Comp. Ex. 34 | VDF | 90 | HFP | 10 | — | — | 0.73 | 10 | Diethyl oxalate |
| Comp. Ex. 35 | VF | 98 | HFP | 2 | — | — | 0.79 | 10 | Diethyl oxalate |
| Ex. 24 | VF | 56 | HFP | 44 | — | — | 0.51 | 30 | Diethyl oxalate |
| Comp. Ex. 36 | VDF | 56 | HFP | 44 | — | — | 0.51 | 30 | Diethyl oxalate |
| Comp. Ex. 37 | VF | 44 | HFP | 56 | — | — | 0.50 | 30 | Diethyl oxalate |
| Ex. 25 | VF | 80 | HFP | 20 | — | — | 0.73 | 20 | Diethyl malonate |
| Comp. Es. 38 | VDF | 80 | HFP | 20 | — | — | 0.63 | 20 | Diethyl malonate |
| Comp. Ex. 39 | VF | 97 | HFP | 3 | — | — | 0.78 | 10 | Diethyl malonate |
| Comp. Ex. 40 | VF | 46 | HFP | 54 | — | — | 0.60 | 30 | Diethyl malonate |
| Ex. 26 | VF | 74.7 | HFP | 25.0 | AA | 0.3 | 0.63 | 30 | Diethyl malonate |
| Comp. Ex. 41 | VDF | 74.7 | HFP | 25.0 | AA | 0.3 | 0.66 | 30 | Diethyl malonate |
| Ex. 27 | VF | 58 | HFP | 42 | — | — | 0.55 | 30 | Dimethyl adipate |
| Comp. Ex. 42 | VDF | 58 | HFP | 42 | — | — | 0.51 | 30 | Dimethyl adipate |
| Ex. 28 | VF | 65 | HFP | 35 | — | — | 0.59 | 30 | Tetrahydrofuran |
| Comp. Ex. 43 | VDF | 65 | HFP | 35 | — | — | 0.55 | 30 | Tetrahydrofuran |
| Ex. 29 | VF | 90.5 | HFP | 9.5 | — | — | 0.81 | 10 | Tetrahydrofuran |
| Comp. Ex. 44 | VDF | 90.5 | HFP | 9.5 | — | — | 0.74 | 10 | Tetrahydrofuran |
| Comp. Ex. 45 | VF | 97 | HFP | 3 | — | — | 0.78 | 10 | Tetrahydrofuran |
| Ex. 30 | VF | 55 | HFP | 45 | — | — | 0.63 | 30 | Tetrahydrofuran |
| Comp. Ex. 46 | VDF | 55 | HFP | 45 | — | — | 0.53 | 30 | Tetrahydrofuran |
| Comp. Ex. 47 | VF | 45 | HFP | 55 | — | — | 0.54 | 30 | Tetrahydrofuran |
| Ex. 31 | VF | 58 | HFP | 42 | — | — | 0.55 | 30 | 1,3-Dioxane |
| Comp. Ex. 48 | VDF | 58 | HFP | 42 | — | — | 0.51 | 30 | 1,3-Dioxane |
| Ex. 32 | VF | 74.7 | HFP | 25.0 | GMA | 0.3 | 0.70 | 30 | 1,3-Dioxane |
| Comp. Ex. 49 | VDF | 74.7 | HFP | 25.0 | GMA | 0.3 | 0.67 | 30 | 1,3-Dioxane |
| Comp. Ex. 50 | VF | 73.4 | HFP | 25.0 | GMA | 1.6 | 0.66 | 10 | 1,3-Dioxane |
| Ex. 33 | VF | 73 | HFP | 27 | — | — | 0.61 | 30 | 1,3-Dioxane |
| Comp. Ex. 51 | VF | 73 | HFP | 27 | — | — | 0.61 | 10 | Ethyleneglycol monomethylether |
| Comp. Ex. 52 | VF | 73 | HFP | 27 | — | — | 0.61 | 10 | Ethylether |
| Ex. 34 | VF | 73 | HFP | 27 | — | — | 0.61 | 30 | Acetonitrile |
| Comp. Ex. 53 | VDF | 73 | HFP | 27 | — | — | 0.58 | 30 | Acetonitrile |
| Ex. 35 | VF | 89 | HFP | 11 | — | — | 0.81 | 10 | Acetonitrile |
| Comp. Ex. 54 | VDF | 89 | HFP | 11 | — | — | 0.75 | 10 | Acetonitrile |
| Comp. Ex. 55 | VF | 97 | HFP | 3 | — | — | 0.78 | 10 | Acetonitrile |
| Ex. 36 | VF | 58 | HFP | 42 | — | — | 0.55 | 30 | Acetonitrile |
| Comp. Ex. 56 | VDF | 58 | HFP | 42 | — | — | 0.51 | 30 | Acetonitrile |
| Comp. Ex. 57 | VF | 42 | HFP | 58 | — | — | 0.60 | 30 | Acetonitrile |

Table 2-continued

Liquid Coating Composition

| | | | | | | | | | |
|---|---|---|---|---|---|---|---|---|---|
| Ex. 37 | VF | 74.7 | HFP | 25.0 | GMA | 0.3 | 0.70 | 30 | Acetonitrile |
| Comp. Ex. 58 | VDF | 74.7 | HFP | 25.0 | GMA | 0.3 | 0.67 | 30 | Acetonitrile |
| Ex. 38 | VF | 73 | HFP | 27 | — | — | 0.61 | 30 | Propionitrile |
| Comp. Ex. 59 | VDF | 73 | HFP | 27 | — | — | 0.58 | 30 | Propionitrile |
| Ex. 39 | VF | 88 | HFP | 12 | — | — | 0.79 | 10 | Propionitrile |
| Comp. Ex. 60 | VDF | 88 | HFP | 12 | — | — | 0.77 | 10 | Propionitrile |
| Comp. Ex. 61 | VF | 97 | HFP | 3 | — | — | 0.78 | 10 | Propionitrile |
| Ex. 40 | VF | 57 | HFP | 43 | — | — | 0.57 | 30 | Propionitrile |
| Comp. Ex. 62 | VDF | 57 | HFP | 43 | — | — | 0.57 | 30 | Propionitrile |
| Comp. Ex. 63 | VF | 43 | HFP | 57 | — | — | 0.60 | 30 | Propionitrile |
| Ex. 41 | VF | 73 | HFP | 27 | — | — | 0.61 | 30 | Adiponitrile |
| Comp. Ex. 64 | VDF | 73 | HFP | 27 | — | — | 0.58 | 30 | Adiponitrile |

Properties

| No. | Storate stability (hr) | Tensile strength (kg/cm$^2$) | Elongation (%) | Initial Young's modulus (kg/cm$^2$) | Transparency (%) |
|---|---|---|---|---|---|
| Ex. 16 | 360 | 218 | 281 | 2,530 | 87 |
| Comp. Ex. 22 | 5 | 106 | 441 | 13 | 60 |
| Ex. 17 | 240 | 342 | 291 | 4,600 | 90 |
| Comp. Ex. 23 | 6 | 168 | 513 | 83 | 57 |
| Comp. Ex. 24 | (Partially insoluble) | | | | |
| Ex. 18 | over 720 | 179 | 493 | 230 | 83 |
| Comp. Ex. 25 | 10 | 84 | 730 | 12 | 62 |
| Comp. Ex. 26 | over 720 | 99 | 611 | 47 | 82 |
| Ex. 19 | 480 | 238 | 277 | 1,980 | 90 |
| Comp. Ex. 27 | 7 | 98 | 433 | 15 | 55 |
| Comp Ex. 28 | (Insoluble) | | | | |
| Comp. Ex. 29 | over 720 | 95 | 513 | 45 | 87 |
| Ex. 20 | over 720 | 178 | 413 | 731 | 90 |
| Comp. Ex. 30 | 7 | 78 | 555 | 11 | 53 |
| Comp. Ex. 31 | (Insoluble) | | | | |
| Ex. 21 | 240 | 221 | 310 | 3,230 | 88 |
| Comp. Ex. 32 | 3 | 101 | 481 | 60 | 57 |
| Ex. 22 | over 720 | 199 | 318 | 1,080 | 91 |
| Comp. Ex. 33 | 6 | 81 | 513 | 12 | 59 |
| Ex. 23 | 240 | 339 | 218 | 4,730 | 91 |
| Comp. Ex. 34 | 7 | 173 | 613 | 83 | 60 |
| Comp. Ex. 35 | (Insoluble) | | | | |
| Ex. 24 | over 720 | 181 | 731 | 538 | 87 |
| Comp. Ex. 36 | 7 | 83 | 740 | 12 | 60 |
| Comp. Ex. 37 | over 720 | 77 | 430 | 49 | 89 |
| Ex. 25 | 480 | 294 | 215 | 4,500 | 90 |
| Comp. Ex. 38 | 6 | 112 | 531 | 30 | 59 |
| Comp. Ex. 39 | (Partially insoluble) | | | | |
| Comp. Ex. 40 | over 720 | 85 | 483 | 60 | 85 |
| Ex. 26 | 120 | 231 | 433 | 3,940 | 87 |
| Comp. Ex. 41 | 3 | 112 | 495 | 60 | 55 |
| Ex. 27 | 240 | 182 | 269 | 113 | 83 |
| Comp. Ex. 42 | 5 | 78 | 483 | 11 | 57 |
| Ex. 28 | over 720 | 199 | 318 | 1,080 | 88 |
| Comp. Ex. 43 | 10 | 81 | 513 | 12 | 58 |
| Ex. 29 | 240 | 340 | 269 | 4,300 | 90 |
| Comp. Ex. 44 | 10 | 180 | 317 | 70 | 61 |
| Comp. Ex. 45 | (Partially insoluble) | | | | |
| Ex. 30 | over 720 | 180 | 531 | 630 | 90 |
| Comp. Ex. 46 | 10 | 84 | 738 | 12 | 62 |
| Comp. Ex 47 | over 720 | 99 | 611 | 47 | 80 |
| Ex. 31 | over 720 | 182 | 269 | 113 | 87 |
| Comp. Ex. 48 | 7 | 78 | 483 | 11 | 60 |
| Ex. 32 | over 720 | 228 | 315 | 3,120 | 88 |
| Comp. Ex. 49 | 4 | 106 | 428 | 61 | 58 |
| Comp. Ex. 50 | (Partially insoluble) | | | | |
| Ex. 33 | over 720 | 231 | 267 | 2,170 | 87 |
| Comp. Ex. 51 | (Insoluble) | | | | |
| Comp. Ex. 52 | (Insoluble) | | | | |
| Ex. 34 | over 720 | 231 | 267 | 2,170 | 87 |
| Comp. Ex. 53 | 6 | 95 | 613 | 14 | 60 |
| Ex. 35 | 240 | 339 | 271 | 4,650 | 83 |
| Comp. Ex. 54 | 10 | 169 | 477 | 83 | 58 |
| Comp. Ex. 55 | (Partially insoluble) | | | | |
| Ex. 36 | 360 | 182 | 269 | 113 | 84 |
| Comp. Ex. 56 | 7 | 78 | 483 | 11 | 60 |
| Comp. Ex. 57 | over 720 | 80 | 432 | 52 | 86 |
| Ex. 37 | over 720 | 228 | 315 | 3,120 | 89 |
| Comp. Ex. 58 | 5 | 106 | 428 | 61 | 57 |
| Ex. 38 | over 720 | 231 | 267 | 2,160 | 89 |
| Comp. Ex. 59 | 10 | 95 | 613 | 14 | 60 |
| Ex. 39 | 168 | 340 | 269 | 4,570 | 88 |
| Comp. Ex. 60 | 10 | 169 | 477 | 83 | 56 |

Table 2-continued

| | Liquid Coating Composition | | | | |
|---|---|---|---|---|---|
| Comp. Ex. 61 | (Insoluble) | | | | |
| Ex. 40 | over 720 | 177 | 534 | 620 | 90 |
| Comp. Ex. 62 | 10 | 80 | 740 | 12 | 58 |
| Comp. Ex. 63 | over 720 | 82 | 433 | 115 | 79 |
| Ex. 41 | 240 | 231 | 267 | 2,170 | 81 |
| Comp. Ex. 64 | 3 | 95 | 613 | 14 | 60 |

EXAMPLES 42 TO 50 AND COMPARATIVE EXAMPLES 65 TO 73

Using solvents of groups (7) mentioned hereinabove, liquid coating compositions were prepared in the same way as set forth in Example 6. The results are given in Table 3.

EXAMPLES 51 TO 55 AND COMPARATIVE EXAMPLES 74 TO 80

Liquid coating compositions were prepared using a copolymer having an inherent viscosity of 0.71 and derived from 70.7 mol % of vinyl fluoride and 29.3 mol % of hexafluoropropylene and various solvents. The results are given in Table 4.

Table 3

| | Liquid Coating Composition | | | | | | | | |
|---|---|---|---|---|---|---|---|---|---|
| | Resin Component | | | | | | | Inherent Viscosity ($\eta$inh) | Resin Concentration (% by wt.) |
| | 1st Component | | 2nd Component | | 3rd Component | | | | |
| No. | Kind | Mol % | Kind | Mol % | Kind | Mol % | | | Solvent |
| Ex. 42 | VF | 65 | HFP | 35 | — | — | 0.59 | 30 | Diethyl carbonate |
| Comp. Ex. 65 | VDF | 65 | HFP | 35 | — | — | 0.55 | 30 | Diethyl carbonate |
| Ex. 43 | VF | 52 | HFP | 48 | — | — | 0.50 | 30 | Ethylene carbonate |
| Comp. Ex. 66 | VDF | 52 | HFP | 48 | — | — | 0.51 | 30 | Ethylene carbonate |
| Ex. 44 | VF | 80 | HFP | 20 | — | — | 0.73 | 20 | cyclohexanone |
| Comp. Ex. 67 | VDF | 80 | HFP | 20 | — | — | 0.63 | 20 | cyclohexanone |
| Ex. 45 | VF | 60 | HFP | 40 | — | — | 0.59 | 30 | N,N-dimethyl formamide |
| Comp. Ex. 68 | VDF | 60 | HFP | 40 | — | — | 0.53 | 30 | N,N-dimethyl formamide |
| Ex. 46 | VF | 80 | HFP | 20 | — | — | 0.73 | 20 | N,N-dimethyl acetamide |
| Comp. Ex. 69 | VDF | 80 | HFP | 20 | — | — | 0.63 | 20 | N,N-dimethyl acetamide |
| Ex. 47 | VF | 73 | HFP | 27 | — | — | 0.61 | 30 | Dimethyl sulfoxide |
| Comp. Ex. 70 | VDF | 73 | HFP | 27 | — | — | 0.58 | 30 | Dimethyl sulfoxide |
| Ex. 48 | VF | 58 | HFP | 42 | — | — | 0.55 | 30 | N-Methyl pyrrolidone |
| Comp. Ex. 71 | VDF | 58 | HFP | 42 | — | — | 0.51 | 30 | N-Methyl pyrrolidone |
| Ex. 49 | VF | 75 | HFP | 25 | — | — | 0.66 | 30 | γ-Butyrolacetone |
| Comp. Ex. 72 | VDF | 75 | HFP | 25 | — | — | 0.61 | 30 | γ-Butyrolacetone |
| Ex. 50 | VF | 74.6 | HFP | 25.0 | GMA | 0.4 | 0.53 | 30 | N,N-dimethyl formamide |
| Comp. Ex. 73 | VDF | 74.6 | HFP | 25.0 | GMA | 0.4 | 0.55 | 30 | N,N-dimethyl formamide |

| | Properties | | | | |
|---|---|---|---|---|---|
| No. | Storage stability (hr) | Tensile strength (kg/cm$^2$) | Elongation (%) | Initial Young's modulus (kg/cm$^2$) | Transparency (%) |
| Ex. 42 | over 720 | 199 | 318 | 1,080 | 88 |
| Comp. Ex. 65 | 10 | 81 | 513 | 12 | 56 |
| Ex. 43 | Over 720 | 171 | 531 | 135 | 84 |
| Comp. Ex. 66 | 10 | 67 | 667 | 10 | 59 |
| Ex. 44 | 360 | 294 | 215 | 4,500 | 90 |
| Comp. Ex. 67 | 10 | 112 | 530 | 31 | 59 |
| Ex. 45 | over 720 | 178 | 413 | 731 | 89 |
| Comp. Ex. 68 | 3 | 78 | 555 | 11 | 53 |
| Ex. 46 | 250 | 294 | 215 | 4,500 | 90 |
| Comp. Ex. 69 | 6 | 112 | 531 | 30 | 60 |
| Ex 47 | over 720 | 231 | 267 | 2,170 | 76 |
| Comp. Ex. 70 | 7 | 95 | 613 | 14 | 54 |
| Ex. 48 | over 720 | 182 | 269 | 113 | 87 |
| Comp. Ex. 71 | 6 | 78 | 483 | 11 | 55 |
| Ex. 49 | 480 | 238 | 277 | 2,000 | 89 |
| Comp. Ex. 72 | 10 | 98 | 433 | 15 | 55 |
| Ex. 50 | over 720 | 238 | 306 | 4,120 | 88 |
| Comp. Ex. 73 | 6 | 101 | 418 | 60 | 55 |

Table 4

| | Solvent | | | A/B/C (wt. %) | Resin concentration (% by wt.) | Properties | | | | |
|---|---|---|---|---|---|---|---|---|---|---|
| No. | A | B | C | | | Storate stability (hr.) | Tensile strength (kg/cm$^2$) | Elongation (%) | Initial Young's modulus (kg/cm$^2$) | Transparency (%) |
| Ex. 51 | Acetone | Butyl acetate | | 1/1 | 30 | over 720 | 220 | 273 | 2,340 | 88 |
| Ex. 52 | Methylethyl ketone | Methylisobutyl ketone | | 3/2 | 30 | over 720 | 220 | 273 | 2,340 | 89 |

Table 4-continued

| No. | Solvent A | Solvent B | Solvent C | A/B/C (wt. %) | Resin concentration (% by wt.) | Storage stability (hr.) | Tensile strength (kg/cm$^2$) | Elongation (%) | Initial Young's modulus (kg/cm$^2$) | Transparency (%) |
|---|---|---|---|---|---|---|---|---|---|---|
| Ex. 53 | Methylethyl ketone | Methylisobutyl ketone | | 1/1 | 30 | over 720 | 220 | 273 | 2,340 | 90 |
| Ex. 54 | Methylethyl ketone | Methylisobutyl ketone | Cellosolve acetate | 1/2/1 | 30 | over 720 | 220 | 273 | 2,340 | 92 |
| Ex. 55 | Butyl acetate | Isoamylacetate | Cellosolve acetate | 1/2/1 | 30 | over 720 | 220 | 273 | 2,340 | 90 |
| Comp. Ex. 74 | Methylethyl ketone | Formic acid | | 3/2 | 30 | (Partially insoluble) | | | | |
| Comp. Ex. 75 | Methylethyl ketone | Methyl laurate | | 3/2 | 30 | (Partially insoluble) | | | | |
| Comp. Ex. 76 | Methylethyl ketone | Ethyleneglycol monomethylether | | 3/2 | 30 | (Partially insoluble) | | | | |
| Comp. Ex. 77 | Methylethyl ketone | Methylphenyl ketone | | 3/2 | 30 | (Partially insoluble) | | | | |
| Comp. Ex. 78 | Methylethyl ketone | Benzylacetate | | 3/2 | 30 | (Partially insoluble) | | | | |
| Comp. Ex. 79 | Methylethyl ketone | Methyl salicylate | | 3/2 | 30 | (Partially insoluble) | | | | |
| Comp. Ex. 80 | Methylethyl ketone | Methyl benzoate | Cellosolve acetate | 1/2/1 | 30 | (Partialy insoluble) | | | | |

EXAMPLES 56 TO 62 AND COMPARATIVE EXAMPLES 81 TO 88

A polished steel plate (90×70×1 mm) which had been thoroughly degreased and cleaned, polished with water proof polishing paper No. 280, washed with water, immersed in ethyl alcohol and air dried was coated with Epilite 400 Red Red primer in a film thickness of 20 microns. After drying in the air, a secondary primer of the following formulation was coated thereon.

FORMULATION OF THE SECONDARY PRIMER

| | |
|---|---|
| Copolymer ($\eta_{inh}$=0.28) composed of (A), (B), (C) and (D): | 35 parts by weight |
| (A) Methyl methacrylate | 66.5% by weight |
| (B) Butyl acrylate | 19.0% by weight |
| (C) 2-Ethylhexyl acrylate | 9.5% by weight |
| (D) Acrylic acid | 5.0% by weight |
| Methyl ethyl ketone | 30 parts by weight |
| Toluene | 35 parts by weight |
| Zinc chromatic C | 10 parts by weight |

After coating, the coated layer was dried in air for 20 hours (thickness 10 microns). On top of the secondary coating, a liquid composition having a thickness of 20 microns each consisting of the resin components, solvents and additives shown in Table 5 was coated. The coated layer was dried in the air for 48 hours. The properties of the coating layer after air drying are shown in Table 5.

Table 5

| | Liquid Coating Composition | | | | | | | |
|---|---|---|---|---|---|---|---|---|
| | Resin Component | | | | | | Inherent Viscosity | Resin Concentration |
| | 1st Component | | 2nd Component | | 3rd Component | | | |
| No. | Kind | Mol % | Kind | Mol % | Kind | Mol % | ($\eta$inh) | (% by wt.) |
| Ex. 56 | VF | 70 | HFP | 30 | — | — | 0.31 | 30 |
| Comp. Ex. 81 | VDF | 70 | HFP | 30 | — | — | 0.32 | 30 |
| Ex. 57 | VF | 70 | HFP | 30 | — | — | 0.31 | 30 |
| Comp. Ex. 82 | VDF | 70 | HFP | 30 | — | — | 0.32 | 30 |
| Ex. 58 | VF | 75 | HFP | 25 | — | — | 0.26 | 30 |
| Comp. Ex. 83 | VDF | 75 | HFP | 25 | — | — | 0.25 | 30 |
| Ex. 59 | VF | 74.7 | HFP | 25 | GMA | 0.3 | 0.52 | 30 |
| Comp. Ex. 84 | VDF | 74.7 | HFP | 25 | GMA | 0.3 | 0.51 | 30 |
| Ex. 60 | VF | 55 | HFP | 45 | — | — | 0.40 | 30 |
| Comp. Ex. 85 | VDF | 55 | HFP | 45 | — | — | 0.38 | 30 |
| Comp. Ex. 86 | VF | 45 | HFP | 55 | — | — | 0.41 | 30 |
| Ex. 61 | VF | 74.5 | HFP | 25 | GMA | 0.5 | 0.30 | 30 |
| Comp. Ex. 87 | VDF | 74.5 | HFP | 25 | GMA | 0.5 | 0.29 | 30 |
| Ex. 62 | VF | 70 | HFP | 30 | — | — | 0.41 | 30 |
| Comp. Ex. 88 | VDF | 70 | HFP | 30 | — | — | 0.39 | 30 |

| | Liquid Coating Composition | | | | | | Properties | | |
|---|---|---|---|---|---|---|---|---|---|
| | Solvent | | | Additives | | | Storage | | |
| No. | A (weight ratio) | B (weight ratio) | C (weight ratio) | A (wt. %) | B (wt. %) | C (wt. %) | stability (hr) | Pencil hardness | Gloss |
| Ex. 56 | Methyl ethyl ketone 1 | Butyl acetate 1 | | TiO$_2$ 9 | — | — | over 720 | HB | 40 |
| Comp. | Methyl ethyl | Butyl acetate | | TiO$_2$ | — | — | 6 | 2B - B | 15 |

Table 5-continued

| | Liquid Coating Composition | | | | | | | | | |
|---|---|---|---|---|---|---|---|---|---|---|
| Ex. 81 | ketone 1 | 1 | | 9 | | | | | | |
| Ex. 57 | Butyl acetate 1 | Isoamyl acetate 2 | Cellosolve acetate 1 | TiO$_2$ 9 | — | — | over 720 | HB | 60 | |
| Comp. Ex. 82 | Butyl acetate 1 | Isoamyl acetate 2 | Cellosolve acetate 1 9 | TiO$_2$ 9 | — | — | 7 | 2B - B | 20 | |
| Ex. 58 | Butyl acetate 1 | Isoamyl acetate 2 | Cellosolve acetate 1 | TiO$_2$ 9 | Talc 1 | — | over 720 | HB - H | 55 | |
| Comp. Ex. 83 | Butyl acetate 1 | Isoamyl acetate 2 | Cellosolve acetate 1 | TiO$_2$ 9 | Talc 1 | — | 9 | B | 17 | |
| Ex. 59 | Butyl acetate 1 | Isoamyl acetate 2 | Cellosolve acetate 1 | TiO$_2$ 9 | — | — | over 720 | H | 35 | |
| Comp. Ex. 84 | Butyl acetate 1 | Isoamyl acetate 2 | Cellosolve acetate 1 | TiO$_2$ 9 | — | —5 | B | 13 | | |
| Ex. 60 | Methyl ethyl ketone 1 | Butyl acetate 2 | | TiO$_2$ 9 | Talc 5 | — | over 720 | B - HB | 62 | |
| Comp. Ex. 85 | Methyl ethyl ketone 1 | Butyl acetate 1 | | TiO$_2$ 9 | Talc 5 | 10 | 2B | 22 | | |
| Comp. Ex. 86 | Methyl ethyl ketone 1 | Butyl acetate 1 | | TiO$_2$ 9 | Talc 5 | — | over 720 | 2B | 65 | |
| Ex. 61 | Methyl ethyl ketone 1 | Butyl acetate 2 | Isoamyl acetate 1 | TiO$_2$ 9 | — | — | over 720 | HB - H | 45 | |
| Comp. Ex. 87 | Methyl ethyl ketone 1 | Butyl acetate 2 | Isoamyl acetate 1 | TiO$_2$ 9 | — | — | 10 | B | 18 | |
| Ex. 62 | Methyl ethyl ketone 1 | Butyl acetate 2 | Isoamyl acetate 1 | TiO$_2$ 9 | Dimethyl phthalate 0.2 | Poly(methyl methacrylate) 1 | over 720 | HB | 57 | |
| Comp. Ex. 88 | Methyl ethyl ketone 1 | Butyl acetate 2 | Isoamyl acetate 1 | TiO$_2$ 9 | Dimethyl phthalate 0.2 | Poly(methyl) methacrylate) 1 | 8 | 2B | 23 | |

EXAMPLES 63 TO 67 AND COMPARATIVE EXAMPLES 89 TO 93

The copolymer, the cross-linking agent and additive were dissolved in methyl ethyl ketone so that the solids content of the copolymer became 20% by weight. A coated layer was prepared from the composition obtained. The coated layer was cured at various temperatures for various periods of time. The results are shown in Table 6.

Table 6

| | Resin Component | | | | | | Cross-linking Agent | |
|---|---|---|---|---|---|---|---|---|
| | 1st Component | | 2nd Component | | 3rd Component | | Inherent | | Amount based |
| No. | Kind | Mol % | Kind | Mol % | Kind | Mol % | Viscosity | Kind | on the resin |
| Ex. 63 | VF | 90 | HFP | 10 | — | — | 0.81 | Triethylene tetramine | 5 wt. % |
| Comp. Ex. 89 | VDF | 90 | HFP | 10 | — | — | 0.79 | Triethylene tetramine | 5 wt. % |
| Ex. 64 | VF | 84 | HFP | 16 | — | — | 0.77 | Hexamethylene diamine | 5 wt. % |
| Comp. Ex. 90 | VDF | 84 | HFP | 16 | — | — | 0.78 | Hexamethylene diamine | 5 wt. % |
| Ex. 65 | VF | 80 | HFP | 20 | — | — | 0.80 | Triethylene tetramine | 5 wt. % |
| Comp. Ex. 91 | VDF | 80 | HFP | 20 | — | — | 0.81 | Triethylene tetramine | 5 wt. % |
| Ex. 66 | VF | 70 | HFP | 30 | — | — | 0.67 | Triethylene tetramine | 5 wt. % |
| Comp. Ex. 92 | VDF | 70 | HFP | 30 | — | — | 0.52 | Triethylene tetramine | 5 wt. % |
| Ex. 67 | VF | 74.7 | HFP | 25 | GMA | 0.3 | 0.52 | Triethylene tetramine | 5 wt. % |
| Comp. Ex. 93 | VDF | 74.7 | HFP | 25 | GMA | 0.3 | 0.49 | Triethylene tetramine | 5 wt. % |

| | Additives | | | | | | Properties of Coated Film | | |
|---|---|---|---|---|---|---|---|---|---|
| | A | | B | | Baking Conditions | | Tensile | | Initial Young's |
| | | Amount based on | | Amount based on | Temp. | Time | strength | Elongation | modulus |
| No. | Kind | the resin | Kind | the resin | (°C.) | (Min.) | (kg/cm$^2$) | (%) | (kg/cm$^2$) |
| Ex. 63 | — | — | — | — | 200 | 15 | 362 | 48 | 23,400 |
| Comp. Ex. 89 | — | — | — | — | 200 | 15 | 201 | 185 | 162 |
| Ex. 64 | — | — | — | — | 180 | 20 | 294 | 50 | 25,120 |
| Comp. Ex. 90 | — | — | — | — | 180 | 20 | 188 | 195 | 100 |
| Ex. 65 | Carbon black | 20 wt. % | — | — | 230 | 5 | 287 | 47 | 27,300 |
| Comp. Ex. 91 | Carbon black | 20 wt. % | — | — | 230 | 5 | 167 | 201 | 97 |
| Ex. 66 | Carbon black | 20 wt. % | MgO | 10 wt. % | 200 | 10 | 267 | 43 | 26,700 |
| Comp. Ex. 92 | Carbon black | 20 wt. % | MgO | 10 wt. % | 200 | 10 | 166 | 198 | 100 |
| Ex. 67 | Carbon black | 20 wt. % | MgO | 10 wt. % | 200 | 10 | 348 | 55 | 29,800 |

| | | Table 6-continued | | | | | |
|---|---|---|---|---|---|---|---|
| Comp. Ex. 93 | Carbon black | 20 wt. % | MgO | 10 wt. % | 200 | 10 | 180 | 189 | 98 |

COMPARATIVE EXAMPLES 94 TO 101

These comparative examples establish that, when the inherent viscosity falls below the specified lower limit of 0.2, the objectives of the liquid coating of the present invention cannot be obtained.

A 100-ml autoclave, after being completely purged with nitrogen, was charged with 60 parts of acetone. 0.263 parts of diisopropyl peroxydicarbonate was added to the autoclave in a nitrogen current while cooling it with a dry ice-methanol coolant. The autoclave was then sealed and carefully purged with nitrogen under reduced pressure. 11.2 parts of vinyl fluroide and 15.1 parts of hexafluoropropylene, which were separately prepared, were then successively charged into the autoclave by means of distillation. Immediately after the temperature of the reaction mixture was returned to room temperature, the mixture was subjected to the action of a rotary constant-temperature shaking apparatus at 50° C. and the polymerization reaction was conducted for 8 hours. After reacted monomers were recovered from the reaction, 78.9 parts of a colorless, transparent liquid mixture was obtained. 10 parts of this mixture were then taken and, after completely removing acetone under reduced pressure, 2.4 parts of a liquid copolymer were obtained at a yield of 72%. The liquid copolymer had an inherent viscosity of 0.05. When a glass plate was coated with an acetone solution of the resultant polymer, a film-like coating could not be obtained and only a viscous liquid was left on the plate.

The procedure of Comparative Experiment 94 was repeated except that the acetone polymerization medium was substituted by the polymerization medium noted below in Table 7. The results obtained are also shown in Table 7. In every one of the Comparative Experiments 94–101, film formation was extremely difficult.

COMPARATIVE EXPERIMENTS 102 TO 103

These comparative examples show the inapplicability of various solvents falling outside of the scopes of the present invention in preparing liquid coating compositions in the form of solvent solutions of vinyl fluoride-hexafluoropropylene copolymers.

COMPARATIVE EXAMPLE 102

Following the method of Comparative Example 8, 10 parts by weight of a copolymer (68.3 parts vinyl fluoride and 31.7 parts hexafluoropropylene) were mixed with 90 parts by weight of methyl phenyl ketone. The copolymer was very sparingly soluble at room temperature (20° C.) but a transparent resin solution could be obtained by stirring the mixture at 80° C. for one hour. A glass plate was coated with the resultant resin solution to form a film of 25 microns thickness, but no transparent film could be obtained. The percent transmission at 600 mμ of this film was 30%.

COMPARATIVE EXAMPLE 103

Comparative Example 102 was repeated except that methyl benzoate was used in place of methyl phenyl ketone. A 25 micron film was prepared from a resin solution prepared by dissolving the resin at 80° C. for one hour. Its percent transmission at 600 mμ was 33%.

Thus, it is seen that, although methyl phenyl ketone and methyl benzoate can be used as solvents for polyvinyl fluoride (see, for example, U.S. Pat. Nos. 3,429,844 and 3,340,222), such solvents cannot be used for the hexafluoropropylene-vinyl fluoride copolymers of the present invention.

Since certain changes may be made in the above compositions and process without departing from the scope of the invention herein involved, it is intended that all matter contained in the above description and Table 7

| Comp. Ex. No. | Polymerization medium (parts by wt.) | | Polymerization temp. | Polymerization time | Polymerization yield | Inherent viscosity | Condition of coating |
|---|---|---|---|---|---|---|---|
| 94 | — | acetone (60) | 50° C. | 8 hrs. | 72% | 0.05 | Remained liquid. No film formed. |
| 95 | water (30) | acetone (30) | 50° C. | 8 hrs. | 70% | 0.06 | " |
| 96 | — | hexane (60) | 50° C. | 24 hrs. | 13% | 0.05 | " |
| 97 | water (30) | hexane (30) | 50° C. | 24 hrs. | 12% | 0.06 | " |
| 98 | — | methyl alcohol (60) | 50° C. | 8 hrs | 70% | 0.09 | Filming very flimsy. |
| 99 | water (30) | methyl alcohol (30) | 50° C. | 8 hrs. | 71% | 0.10 | " |
| 100 | — | benzene (60) | 50° C. | 40 hrs. | 9% | 0.03 | Remained liquid. No film formed. |
| 101 | water (30) | benzene (30) | 50° C. | 40 hrs. | 10% | 0.04 | " |

As seen from Table 7, vinyl fluoride-hexafluoropropylene copolymers formed in aqueous and non-aqueous organic solvents, including acetone, hexane, methyl alcohol and benzene, having an inherent viscosity of less than 0.2 cannot be used in preparing satisfactory coatings.

examples shall be interpreted as illustrative and not in a limiting sense.

What we claim is:

1. A liquid coating composition which is stable at room temperature in the form of a solvent solution comprising a vinyl fluoride-hexafluoropropylene copolymer having an inherent viscosity of 0.2 to 2 and composed of 5 to 50 mol% of units derived from hexafluoropropylene, 0 to 10 mol% of units derived from a vinyl ester of an aliphatic carboxylic acid having 1 to 6 carbon atoms or 0 to 1 mol% of units derived from a nonomer selected from the group consisting of unsaturated aliphatic carboxylic acids having 3 to 6 carbon atoms, lower alkyl esters of acrylic acid having an epoxy group, and lower alkyl esters of methacrylic acid having an epoxy group, and the remainder being units derived from vinyl fluoride, a solvent for said vinyl fluoride-hexafluoropropylene copolymer said solvent selected from the group consisting of (1) aliphatic ketones having not over 9 carbon atoms, (2) alkyl esters having not over 10 carbon atoms of aliphatic monocarboxylic acids and halides thereof, (3) lower alkyl esters of aliphatic dicarboxylic acids having 2 to 7 carbon atoms, (4) aliphatic monocarboxylic acids having 2 to 4 carbon atoms and anhydrides thereof, (5) cyclic esters and (6) aliphatic nitriles having 2 to 6 carbon atoms, a cross-linking agent selected from the group consisting of aliphatic polyamines, aromatic polyamines and carbamate derivatives thereof, and a cross-linking promoter selected from oxides of alkaline earth metals, the amount of said copolymer being 1 to 50% by weight as solids content, based on the weight of the composition.

2. The composition of claim 1 wherein the amount of said cross-linking agent is about 0.1 to 10% by weight based on the weight of said copolymer and the amount of the cross-linking promoter is about 5 to about 50% by weight based on the weight of said copolymer.

* * * * *

UNITED STATES PATENT AND TRADEMARK OFFICE
CERTIFICATE OF CORRECTION

PATENT NO. : 4,183,837
DATED : January 15, 1980
INVENTOR(S) : TAMURA, ET AL.

It is certified that error appears in the above-identified patent and that said Letters Patent are hereby corrected as shown below:

Please insert the following after item [22] on the title page:

-- [30] Foreign Application Priority Data
    July 5, 1971    Japan..................46-49444
    July 29, 1971    Japan..................46-57014
    August 23, 1971  Japan..................46-64267 --

Signed and Sealed this

Twenty-second Day of April 1980

[SEAL]

Attest:

SIDNEY A. DIAMOND

Attesting Officer    Commissioner of Patents and Trademarks